United States Patent [19]
Gomez, Jr.

[11] Patent Number: 5,742,999
[45] Date of Patent: Apr. 28, 1998

[54] METHOD OF ASSEMBLING SIDE-MOUNTABLE LIQUID LEVEL SENSOR ASSEMBLY

[75] Inventor: Edward Gomez, Jr., Douglas, Ariz.

[73] Assignee: Standex International Corporation, Salem, N.H.

[21] Appl. No.: 636,285

[22] Filed: Apr. 23, 1996

Related U.S. Application Data

[62] Division of Ser. No. 108,047, Aug. 17, 1993, Pat. No. 5,581,062.

[51] Int. Cl.$^6$ .......................... H01H 11/00; B23P 11/02; B23P 11/00
[52] U.S. Cl. .................... 29/622; 29/453; 29/434
[58] Field of Search ...................... 29/622, 453, 434; 200/84 R, 84 C; 73/322.5

[56] References Cited

U.S. PATENT DOCUMENTS

| | | |
|---|---|---|
| 3,576,413 | 4/1971 | Craeger et al. . |
| 3,588,404 | 6/1971 | Akeley . |
| 3,699,561 | 10/1972 | Putt . |
| 3,750,124 | 7/1973 | Barnes et al. . |
| 3,750,125 | 7/1973 | Ross et al. . |
| 3,849,770 | 11/1974 | Hayashida . |
| 3,868,485 | 2/1975 | Sykes et al. . |
| 3,890,478 | 6/1975 | Riddel . |
| 3,934,103 | 1/1976 | Walstra . |
| 3,978,299 | 8/1976 | Takai . |
| 3,997,744 | 12/1976 | Higo . |
| 4,020,481 | 4/1977 | Nakagawa . |
| 4,090,049 | 5/1978 | Nogami . |
| 4,090,050 | 5/1978 | Siiberg . |
| 4,139,750 | 2/1979 | Rau . |
| 4,158,964 | 6/1979 | McCrea et al. . |
| 4,191,951 | 3/1980 | Fuzzell . |
| 4,217,779 | 8/1980 | Masuda et al. . |
| 4,270,033 | 5/1981 | Hoffmann . |
| 4,318,078 | 3/1982 | Reinartz et al. . |
| 4,356,729 | 11/1982 | Kubota et al. . |
| 4,481,389 | 11/1984 | Johnson . |
| 4,513,185 | 4/1985 | Walters . |
| 4,583,085 | 4/1986 | Beller . |
| 4,594,584 | 6/1986 | Pfeiffer et al. . |
| 4,600,820 | 7/1986 | Bruder et al. . |
| 4,609,796 | 9/1986 | Bergsma . |
| 4,637,254 | 1/1987 | Dyben et al. . |
| 4,644,332 | 2/1987 | Graham . |
| 4,744,808 | 5/1988 | Treu . |
| 4,771,272 | 9/1988 | Barnes . |
| 4,796,473 | 1/1989 | Custer . |
| 4,801,926 | 1/1989 | Bitetti . |
| 4,848,151 | 7/1989 | Bruder et al. . |
| 4,883,928 | 11/1989 | Umehara . |
| 4,922,234 | 5/1990 | Murphy . |
| 5,026,954 | 6/1991 | Cebulski . |
| 5,042,300 | 8/1991 | Benjey et al. . |
| 5,050,430 | 9/1991 | Begin et al. . |
| 5,083,115 | 1/1992 | Kamiya . |
| 5,379,506 | 1/1995 | Park ........................... 29/453 |

FOREIGN PATENT DOCUMENTS

| | | |
|---|---|---|
| 2153327 | 5/1973 | France . |
| 0521573 | 5/1972 | Switzerland . |

OTHER PUBLICATIONS

KIP Leveline Liquid Control "LS1 Series—Sidemount" (date unknown).
Copy of European Search Report in Application EP 94304769.

*Primary Examiner*—P. W. Echols
*Attorney, Agent, or Firm*—Wood, Herron & Evans, L.L.P.

[57] ABSTRACT

A side-mountable liquid level sensor utilizes a rubber sealing grommet to temporarily hold the buoyant member within the cylinder of the liquid container opening to facilitate assembly. The buoyant member has an open slot with cooperating limit structure on the buoyant member and sensor rod to facilitate manufacture.

18 Claims, 3 Drawing Sheets

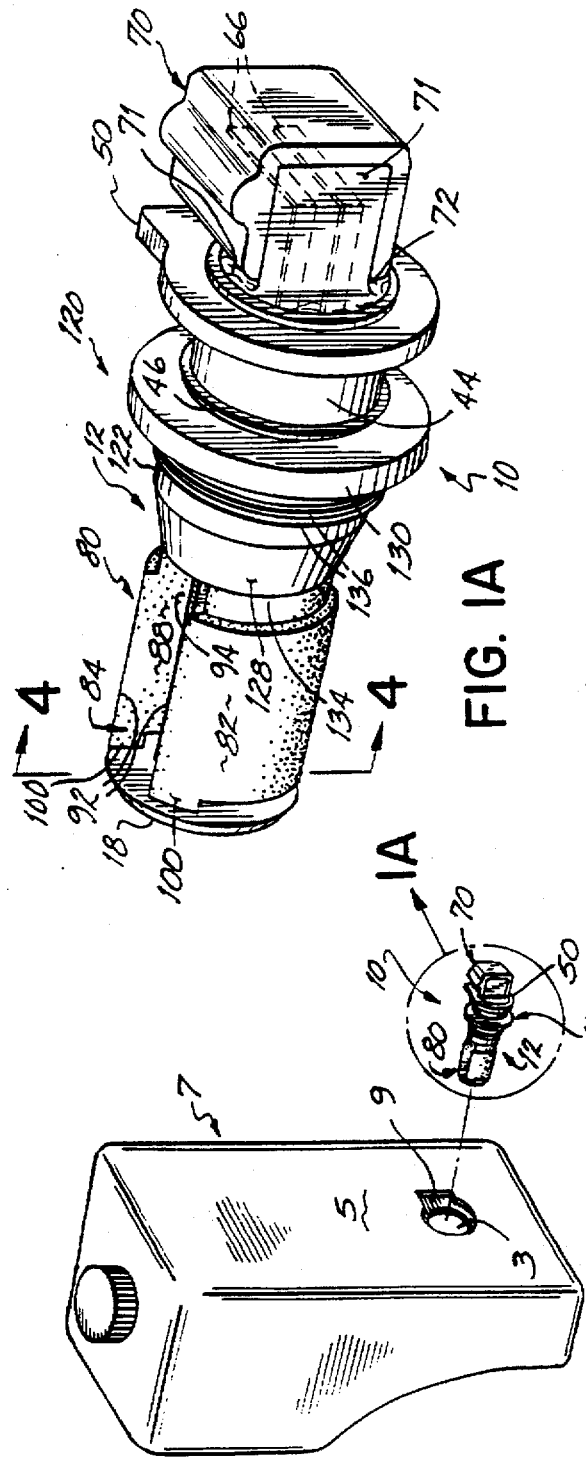
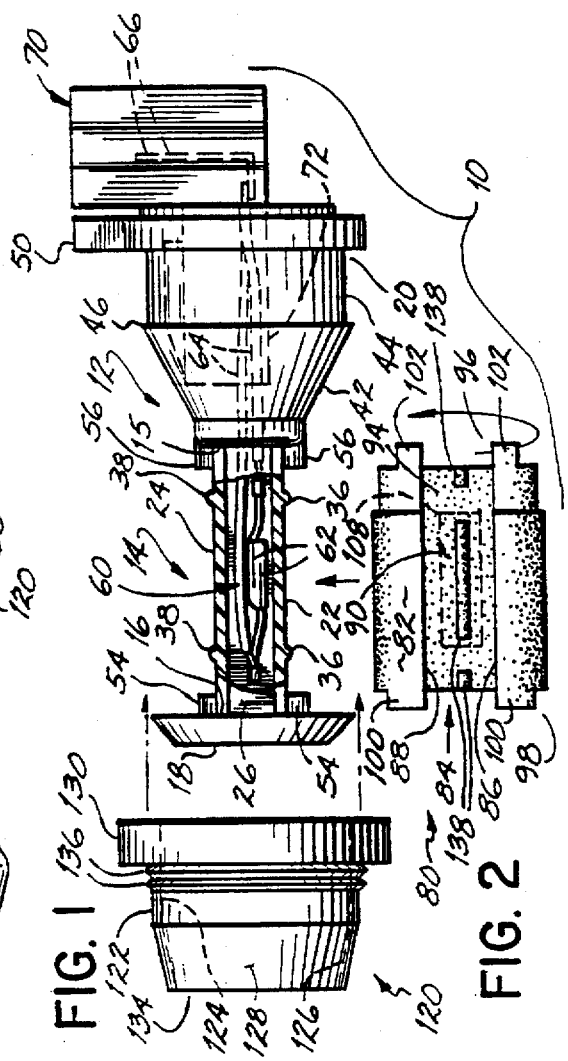
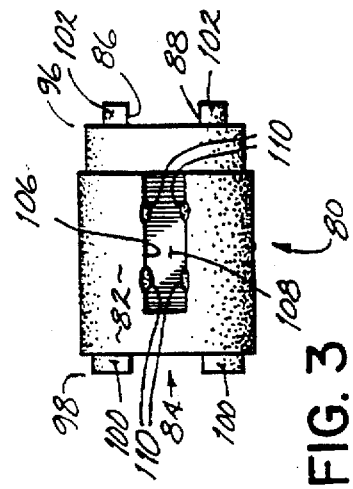

METHOD OF ASSEMBLING SIDE-MOUNTABLE LIQUID LEVEL SENSOR ASSEMBLY

This application is a divisional of application Ser. No. 08/108,047, filed on Aug. 17, 1993, now U.S. Pat. No. 5,581,062.

BACKGROUND OF THE INVENTION

I. Field of the Invention

The present invention relates to liquid level sensors mounted through the sidewall of a liquid container rather than through the top or bottom thereof, and to the method of assembly thereof.

II. Description of Prior Art

To monitor the liquid level in a liquid container, such as an automobile coolant overflow reservoir or windshield washer tank, it has been the practice to provide a liquid level sensor mounted from the top of the container, such as from the cap thereof. Such a liquid level sensor includes a vertical post or rod-like member with a reed switch held adjacent to the top of the rod. The rod passes through the aperture of a toroidal buoyant member mounted around the rod with the toroid carrying a magnet along its top or bottom side so that as the buoyant member rises and falls with the level of liquid in the container, the magnet moves towards and away from the reed switch to open or close same depending on the level of the liquid in the container. An electric circuit connected to the reed switch turns on a light, for example, if the liquid level is unacceptable.

As vehicle manufacturers try to reduce the overall size of the vehicle, there has been a tendency to squeeze the container into locations that make it impractical to mount the liquid level sensor from the cap of the container. As a result, it has been proposed to mount the sensor through the sidewall of the container. Unfortunately, such an arrangement causes the rod to lay horizontal such that the buoyant toroid can no longer move with changes in liquid level.

Various proposals to change the construction of the sensor for side-mount applications are believed to be undesirable. In one proposal, the reed switch is positioned within the rod and the aperture through the buoyant toroid significantly enlarged into a slot so that the buoyant member may rise and fall relative the now-horizontally disposed rod. The magnet is repositioned to the side wall of the buoyant member parallel to the rod so as to open or close the reed switch as the liquid level changes.

While such a proposal now allows for side-mounting the sensor, it is not without important drawbacks, especially with respect to manufacturability and assembly. For example, with the enlarged slot, and to allow for sufficient movement between the rod and magnet, the buoyant member must be free to move outside the cylinder defined by the hole through which the sensor must fit to be mounted through the sidewall of the container. In order to mount the sensor, therefore, the buoyant member must be physically held within that cylinder which presents assembly difficulties.

Additionally, to manufacture the sensor, the buoyant member must be slid over the end of the rod and a retaining clip or the like secured to the end of the rod to prevent the buoyant member from sliding back off the rod. The cost and time associated with such steps and the additional part is undesirable from a manufacturing perspective.

Moreover, foreign material tends to accumulate in the liquid being monitored. The foreign material has a tendency to clog the moving component(s) of some available side-mountable sensors rendering them less useful.

SUMMARY OF THE INVENTION

The present invention provides a side-mountable liquid level sensor that overcomes the above-mentioned drawbacks. To this end, and in accordance with one feature of the present invention, assembly is greatly enhanced by utilizing the resilient grommet that holds the sensor tightly to the side of the fluid container to also hold the buoyant member during assembly. More specifically, the grommet is slidably receivable on the support structure that supports the rod with the grommet initially being slid mostly off the support with the open end thereof slid over the end of the buoyant member to thus hold it within the defined cylinder. As the sensor is inserted, rod first, through the hole in the sidewall of the liquid container, the held-buoyant member passes easily therethrough after which the grommet meets with the periphery of the hole. Further insertion of the sensor causes the rod and buoyant member to move further into the container with the grommet sliding up, over, and onto the support thereby pushing the buoyant member free of the grommet to allow the buoyant member to now move outside the defined cylinder as necessary.

Manufacturability is also enhanced by providing access to the buoyant member slot through the sidewall of the buoyant member such that the rod may be inserted laterally therethrough. In order to facilitate mounting the buoyant member to the rod, limit structure is formed near the open mouth of the aperture and the adjacent portions of the rod which cooperate to, effectively, close the mouth of the aperture once the member is mounted to the rod. The limit structure also holds the buoyant member on the rod so as to eliminate the time and cost of an added element. A large retaining disc may be integrally formed on the end of the rod as well. A sensor constructed according to the principles of the present invention may include standoffs or projections to define gaps between the buoyant member and the rod which gaps avoid accumulation of foreign material that might otherwise cause sticking of the member.

By virtue of the foregoing there is thus provided a side-mountable liquid level sensor that is cost-effective and simple to manufacture and assemble, and which overcomes certain other drawbacks of available side-mountable liquid level sensors. These and other objects and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the principles of the invention.

FIG. 1 is a perspective view of a side-mountable liquid level sensor, and a side-mount liquid container, in accordance with the principles of the present invention;

FIG. 1A is an enlarged view of the encircled sensor of FIG. 1;

FIG. 2 is a top, exploded and partially cut away view of the sensor of FIG. 1;

FIG. 3 is a bottom plan view of the buoyant member of the sensor of FIG. 1;

DETAILED DESCRIPTION OF THE DRAWINGS

Figure 4C:
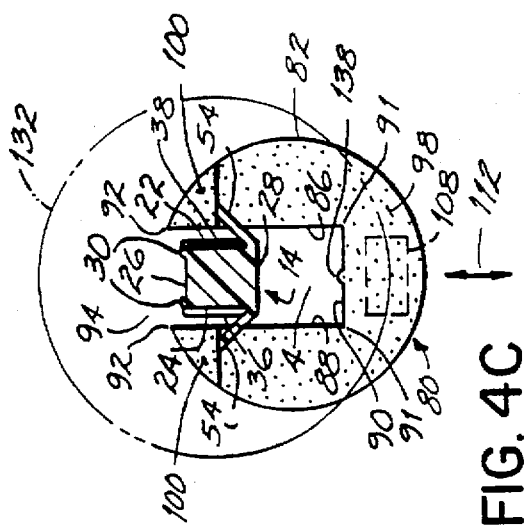
FIGS. 4A–E are views taken along line 4—4 of FIG. 1A for the purpose of describing steps to mount the buoyant member to the rod.

With reference to FIGS. 1, 1A and 2, there is shown a side-mountable liquid level sensor 10 in accordance with the principles of the present invention adapted to be mounted through hole 3 in sidewall 5 of liquid container 7. Sensor 10 includes an injection molded plastic (e.g., polypropylene) component comprised of a support 12 and a rod-like member 14 extending outwardly from and supported by the distal wall 15 of support 12. Formed integral to the distal end 16 of rod 14 is an enlarged disc 18 having a diameter approximately equal to the diameter of support 12 at its proximal end 20 and slightly smaller than the diameter of hole 3 of container 7.

Member 14 has a hollow interior with disc 18 sealing off distal end 16 thereof with proximal end at 15 opening into the interior of support 12. Member 14 is rectangular in cross-section as defined by planar left, right, top and bottom sidewalls 22, 24, 26, 28, respectively (see also FIG. 4A). Top wall 26 may be recessed below the upper edges 30 of left and right sidewalls 22, 24 as seen, for example, in FIG. 4D. Also, formed on sidewalls 22 and 24 are a pair of vertically oriented, triangular cross-section projections 36, 38 which define respective planes (not shown) spaced or gapped from and parallel to walls 22 and 24 for a purpose to be described hereinafter.

Support 12 is formed with tapered distal cone portion 42 and proximal cylinder portion 44, the latter having a diameter slightly smaller than the proximal end 46 of cone 42 to provide a lip thereat. The proximal end 20 of support 12 terminates into an enlarged and keyed flange 50 to mate with pocket 9 around hole 3 of container 7 to facilitate positioning of sensor 10 to the liquid container. Also, formed at respective ends 16 and 15 of rod 14, and merging with the adjacent disc 18 or wall 15, respectively, are a pair of flexible support wings 54, 56 extending outwardly and upwardly from bottom wall 28 away from side walls 22 and 24 at an angle of about 45° to just less than halfway up sides 22, 24. Wings 54 and 56 may be seen to be sideways extensions of rod 14 and thus define portions of rod 14.

Fitted within the interior of member 14 is a switch, such as normally open, 0.5 A current switch rated magnetically actuatable reed switch 60 having its switch contacts 62 extending between ends 16 and 15 along the longitudinal axis of rod 14. Switch 60 may have a sensitivity of between 10 and 50 ampere turns (AT), and is desirably in the 30–40 AT range and may be in the 40–45 range to be less sensitive to electromagnetic signals in the engine compartment. A pair of wires 64 electrically connect respective ones of switch contacts 62 to connector pins 66 held within plastic socket or terminal housing 70 mounted to support 12. Enclosing switch 60 within rod 14 and securing socket 70 to support 12 is material 71 (such as hot melt thermoplastic polyamide resin) filling the interior of support 12 and gripping leg 72 of socket 70 inside support 12.

Sensor 10 also includes buoyant member 80 injected molded from polypropylene with an endothermic blowing or foaming agent. Member 80 is cylindrical in cross-section as defined by generally smooth outer wall 82. Formed within member 80 is a slot 84 having planar left and right sidewalls 86, 88 with a bottom or floor 90 extending between the bottom edges 91 thereof. Sidewalls 86, 88 of slot 84 extend up to and terminate in edges 92 defined along outer wall 82 to define upper aperture or mouth 94 opening into slot 84.

The proximal end 96 of member 80 is of a diameter slightly smaller than that defined by outer wall 82, the latter being approximately equal to the diameter of disc 18. Formed at distal end 98 and proximal end 96 of member 80, near slot edges 92, are a pair of projecting arms 100, 102 extending outwardly of the proximal and distal ends, respectively. Arms 100, 102 cooperate with support wings 54, 56 on rod 14 to effectively close mouth 94 of slot 84 with respect to rod 14 to keep member 80 slidably held thereto as will be described.

As seen in FIG. 3, aperture 106 is formed through outer wall 82 along the bottom side thereof. Aperture 106 is approximately the size of switch actuator bar magnet 108 (e.g., 575 inch×0.235 inch×0.120 inch) mounted therein with its north and south poles adjacent respective ones of the proximal and distal ends 96 and 98 of member 80 so as to extend in parallel to the longitudinal axis thereof. Magnet 108 is held in aperture 106 by melting or otherwise deforming portions of the edge of aperture 106 to define tabs 110 overlying magnet 108 to hold same in place.

Sidewalls 86, 88 of slot 84 are spaced apart a distance slightly greater than the distance between the planes defined by rod-wall projections 36, 38 such that when member 80 is mounted to rod 14, member 80 is generally restrained from rotating completely around rod 14 but is otherwise free to slide vertically relative thereto as indicated by arrow 112 in FIG. 4C such that magnet 108 moves towards and away from reed switch 60 to open or close same as appropriate. Also, the spacing provides non-clogging gaps (e.g., slot 84 is about 0.34 inch wide and the respective projections 36 or 38 define a distance of about 0.29 inch wide tip-to-tip) between rod sidewalls 22, 24 and slot sides 86, 88 which allows for some rotation of member 80, i.e., there is a loose fit, to reduce the likelihood of sticking or clogging.

Figure 4A:
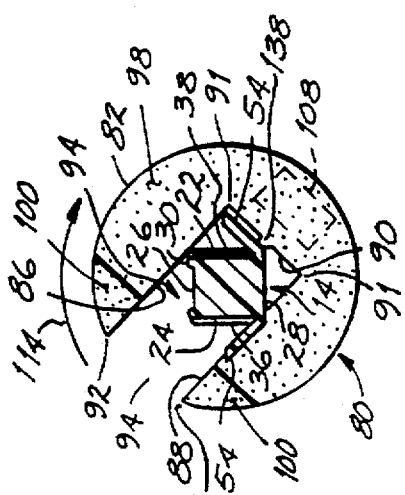
Figure 4B:
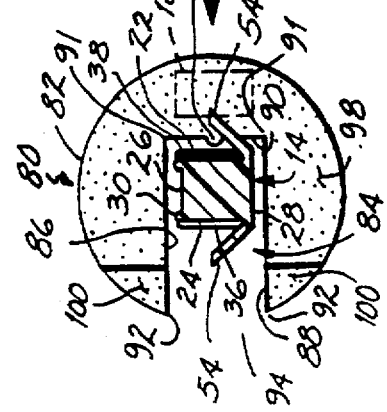

To mount member 80 to rod 14, member 80 is rotated 90° so that slot mouth 94 of slot 84 opens towards a sidewall (e.g., left sidewall 22 as seen in FIG. 4A) and member 80 is slid laterally over rod 14 (and arms 100, 102 over wings 54, 56) so that slot sidewalls 86, 88 are juxtaposed parallel to top and bottom walls 26 and 28 of rod 14. As will be appreciated, end portions of rod 14 will extend out beyond the ends of buoyant member, and it is those portions that hold wings 54, 56. Member 14 is then rotated in the direction of arrow 114 as indicated in FIG. 4B such that arms 100, 102 rotate over wings 54, 56 until slot 84 is upright with sidewalls 86, 88 thereof juxtaposed parallel to vertical projections 36, 38 and rod sidewalls 22, 24 with magnet 108 situated below bottom wall 28 of rod 14, all as seen in FIG. 4C. In this position of member 80, arms 100 and 102 of buoyant member 80 extend out over wing portions 54, 56 of rod 14 in confronting relationship therewith so that member 80 is limited in its downward vertical or lateral movement by cooperation thereof. Arms 100, 102 and wings 54, 56 thus provide cooperating limit structure to hold member 80 onto rod 14 such that mouth 94 of slot 84 is effectively closed. Also, in the event of a freeze and/or thaw of the liquid in container 7, wings 54, 56 can flex to avoid damage to sensor 10. Additionally, wings 54, 56 project out beyond sidewalls 86, 88 of slot 84 to thus confront the ends of member 80 and limit longitudinal travel along rod 14 between support 12 and disc 18. Enlarged size disc 18 aids in protecting member 80 as sensor 10 is slid into container 7 and also aids in keeping member 80 from sliding off the distal end 16 of rod 14 as well. Thus, member 80 is fully captured onto rod 14.

Figure 4D:
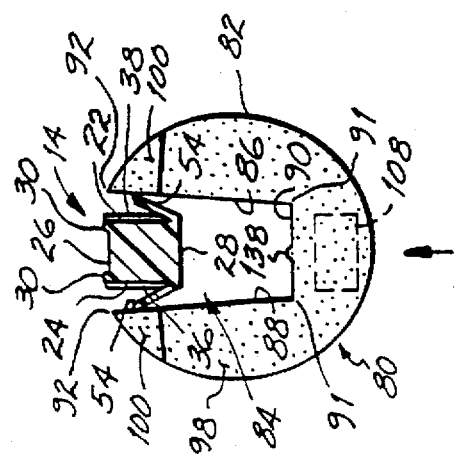
Figure 4E:
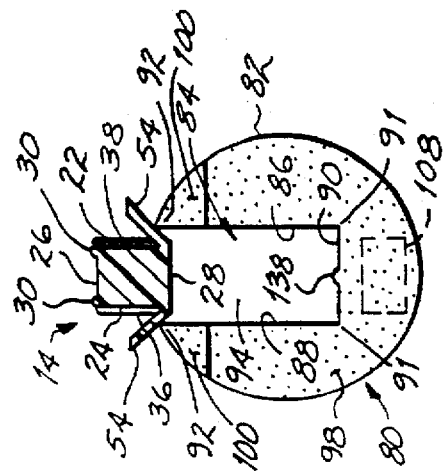

Member 80 may be mounted to rod 14 in an alternative manner by taking advantage of the flexibility of wings 54, 56. In this alternative method of manufacture, slot 84 is aligned with rod 14 with bottom wall 28 adjacent slot opening 94 and the upper surfaces of arms 100, 102 bearing against the bottom, angled surfaces of wings 54, 56 as seen in FIG. 4D. Application of pressure between member 80 and rod 14 causes arms 100, 102 to bear against and partially flex or compress wings 54, 56 as seen in FIG. 4E until arms 100, 102 pass or snap over wings 54, 56 and rod 14 is in slot 84 as seen in FIG. 4C. Thereafter, wings 54, 56 confront arms 100, 102 to prevent member 80 from coming off of rod 14 as previously described. Although not shown, member 80 could be canted along the longitudinal axis of rod 14 during assembly so that a portion of rod 14 is within slot 84 with one set of arms 100, 102 passed over one set of wings 54, 56. The other pair of arms and wings bear against each other to be snapped together as described above.

As will be readily appreciated, when rod 14 is in its horizontal disposition as shown in FIG. 4C, buoyant member 80 will move vertically (i.e. laterally) relative rod 14 depending upon the level of liquid (not shown) around member 80. Consequently, magnet 108 moves towards and away from rod 14 and reed switch 60 therein to thus open or close switch 60 depending upon the level of the liquid. Preferably, the depth of slot 84 and the relationship of wings 54, 56 to arms 100, 102 is such that member 80 normally has at least ¼ inch of travel. Switch 60 is coupled via connector pins 66 to an electrical circuit (not shown) to activate appropriate indicators.

To mount sensor 10 to side-mount liquid level fluid container 7, a resilient grommet 120 (comprised of thermoplastic elastomer, rubber or other resilient material) is provided. Grommet 120 has an exterior wall 122 shaped like support 12 and has an inner cylindrical wall 124 slightly smaller than the diameter of disc 18 to be frictionally fit thereover. The distal end 126 of wall 124 is tapered to follow the taper of cone segment 128 of grommet 120. Prior to mounting member 80 to rod 14, grommet 120 is slid, back or flange end 130 first, over disc 18 and rod 14 until grommet 120 rests up against support 12. Member 80 is then mounted as described above. It will be appreciated that member 80 has a lower-most position (shown in FIG. 4C) in which a portion of member 80 lies outside of cylinder 132 defined by the size of the hole 3 in container 7 through which sensor 10 is to be mounted (see FIG. 5A). As a result, assembly requires that member 80 be held in an upper position with magnet 108 close to rod 14 to thereby keep member 80 within the confines of the space defined by cylinder 132. To facilitate mounting sensor 10 to container 7, and to eliminate the more difficult task of manually holding the member 80 within cylinder 132, grommet 120 may be advantageously employed to simplify the assembly process.

Figure 5A:
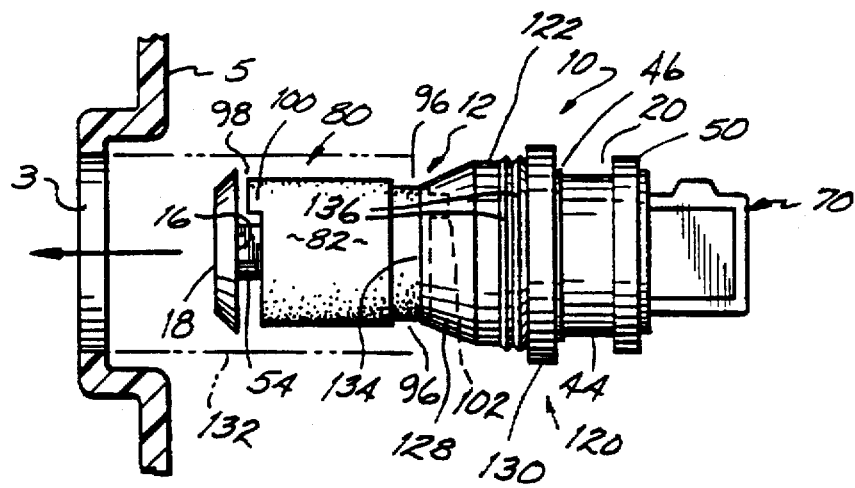
FIGS. 5A–C are views showing the sensor of FIG. 1 being assembled to the side-mount liquid container.
Figure 5B:
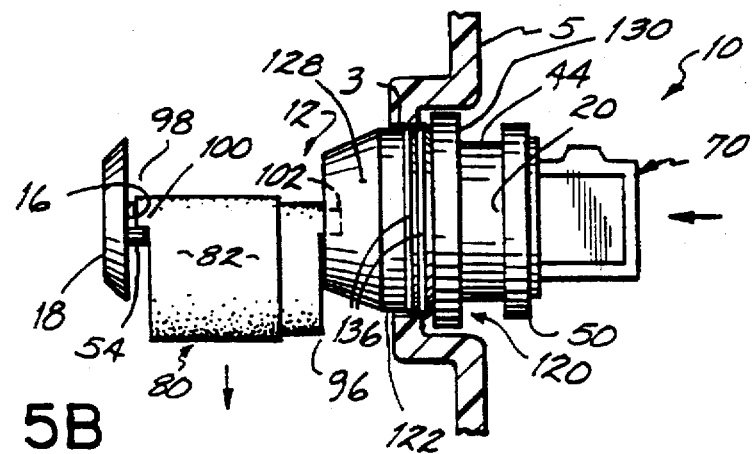
Figure 5C:
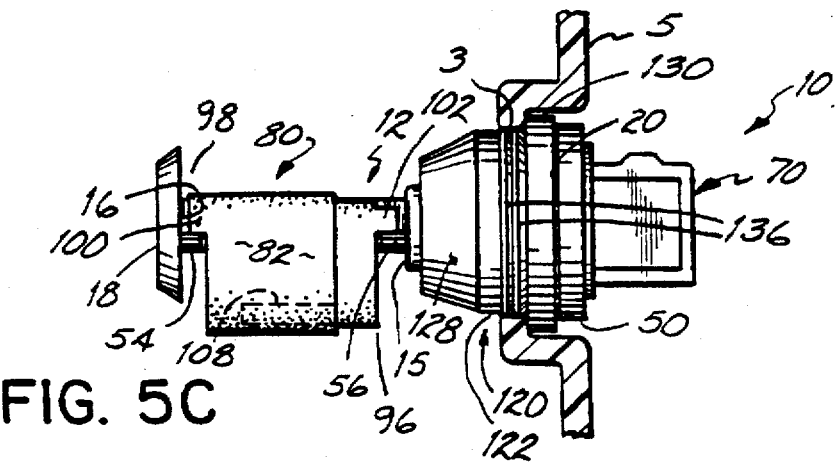

To this end, and in accordance with the principles of the present invention, proximal end or shoulder 96 of buoyant member 80 is receivable within opening 134 of cone portion 126 of grommet 120 as seen in FIG. 5A. In this position of grommet 120, the back end 130 thereof is primarily resting over cone portion 42 of support 12 and operates to restrain member 80 within cylinder 132 and thus to permit easy insertion of disc 18 and member 80 through hole 3 in sidewall 5 of liquid container 7. As sensor 10 is inserted therethrough, such as by pushing from behind support 12, grommet 120 meets up with the periphery of hole 3 after member 80 is completely passed through the hole. Thereafter, further insertion of sensor 10, i.e., further force on support 12, causes grommet 120 to slide up over cone portion 42 while releasing its hold on member 80 (FIG. 5B) which is forced to move with rod 14 by impact of wings 56 confronting proximal end 96 of member 80. When sensor 10 is fully inserted, grommet 120 slides up over lip 46 and rests over cylinder portion 44 of support 12 in a snug liquid-tight relationship therewith and with annular sealing lips 136 on sidewall 122 in sealing engagement with the periphery of hole 3 as seen in FIG. 5C. Also, member 80 is completely free of grommet 120 and is thus free to operate by moving up and down relative rod 14, including outside of cylinder 132, in relation to the level of liquid in container 7.

When sensor 10 is fully seated in container 7, keyed flange 50 fits within pocket 9 formed around hole 3. Pocket 9 is shaped to flange 50 to limit orientation of sensor 10 so that it is essentially positioned with magnet 108 at the bottom of the unit so that member 80 is free to slide up and down and not impact against the sidewalls 22, 24 of rod 14. And, as member 80 slides, the gaps between slot sidewalls 86, 88 and rod sidewalls 22, 24 are maintained open due to vertical projections 36 and 38 so that material cannot become lodged therebetween and interfere with operation of sensor 10. Also, a projection 138 may be provided on floor 90 of slot 84 to prevent sticking between rod bottom wall 28 and slot floor 90. Support 12 and rod 14 are made relatively short so that sensor 10 projects not more than about 61-62 mm into container 7 to thus allow sensor 10 to be used in tight quarters.

In use, grommet 120 is slid over rod 14 and member 80 mounted thereto as previously described. With grommet 120 holding member 80, sensor 10 is slid, disc 18 first, into hole 3 of container 7 until grommet 120 mates snugly into hole 3 with flange 50 in pocket 9. Member 80 is then free to move relative rod 14 depending upon the level of liquid in container 7. Reed switch 60 is electrically connected via pins 66 to appropriate electrical circuitry (not shown) such that the relative position of member 80 to rod 14 will control the circuitry. Specifically, member 80 travels at least ¼ inch between a first, low liquid level position with rod 14 located proximate top edges 92 of slot 84 (see FIG. 4C) and a second, high liquid level position with rod 14 located proximate lower or bottom edges 91 of slot 84. The state of switch 60 indicates to the circuitry whether the liquid level is low or high accordingly.

While the present invention has been illustrated by description of an embodiment of the invention and while the illustrative embodiment has been described in considerable detail, it is not intended to restrict or in any way limit the scope of the appended claims to such detail. Additional advantages and modifications will readily appear to those skilled in the art. For example, projections 36, 38 could be formed on sidewalls 86, 88 rather than sidewalls 22, 24. Similarly, projection 138 could be formed on rod bottom wall 28. The invention in its broader aspects is therefore not limited to the specific details, representative apparatus and methods, and illustrative examples shown and described. Accordingly, departures may be made from such details without departing from the spirit or scope of the general inventive concept.

Having described the invention, what is claimed is:

1. A method of manufacturing a side-mountable liquid level sensor having (a) a rod-like member held to a support such as to be in a generally horizontal disposition when the sensor is side-mounted to a liquid container, the rod-like member having left and right sides and top and bottom sides, and (b) a buoyant member having a slot extending therein from one end thereof, the slot being defined by a pair of sides spaced apart to receive the rod-like member therebetween with the left and right sides of the rod-like member juxtaposed to the slot sides whereby to allow the buoyant member to move laterally relative to the rod-like member depending upon liquid level in the liquid container, the method comprising:

associating a switch actuator with the buoyant member;

receiving a resilient grommet on the support surface;

providing an opening along the slot and through a portion of a peripheral outer wall of the buoyant member sized to receive the rod-like member laterally therethrough and into the slot;

providing the buoyant member with a first arm extending beyond the end of the buoyant member;

providing a first wing extending from one of the left and right sides of the rod-like member adjacent the end of the buoyant member and positioned to confront the first arm of the buoyant member;

positioning the buoyant member such that the slot opening is directed at one of the left and right sides of the rod-like member;

providing relative motion between the rod-like member and the buoyant member to cause the rod-like member to pass laterally into the slot and the arm along the wing with the top and bottom sides of the rod-like member juxtaposed to the slot sides; and rotating the rod-like member and buoyant member relative to each other to rotate the arm over the wing and bring the sides of the slot into juxtaposition with the left and right sides of the rod-like member whereby the first arm and first wing cooperate to prevent the rod-like member from passing back out of the slot through the slot opening.

2. The method of claim 1 wherein the slot extends to a second, opposite end of the buoyant member, the method further comprising:

providing the buoyant member with a second arm extending beyond the second end of the buoyant member;

providing a second wing extending away from one of the left and right sides of the rod-like member adjacent the second end of the buoyant member and positioned to confront the second arm of the buoyant member, wherein the respective arms pass along the respective wings during relative motion between the rod-like member and the buoyant member and, as they are rotated, the second arm also passes over the second wing whereby the second arm and wing also cooperate to prevent the rod-like member from passing back out of the slot through the slot opening.

3. The method of claim 3 further comprising limiting longitudinal sliding of the buoyant member along the rod-like member by extending the first and second wings laterally of the rod-like member to confront the ends of the buoyant member.

4. The method of claim 1 wherein the slot extends to a second, opposite end of the buoyant member, the method further comprising positioning the buoyant member relative the rod-like member such that the arm and wing are spaced distally from the support at a distal end of the rod-like member with the wing confronting the end of the buoyant member to constrain the buoyant member from sliding longitudinally off the distal end of the rod-like member.

5. The method of claim 1 wherein the slot extends to a second, opposite end of the buoyant member, the method further comprising forming an integral enlarged disc at an end of the rod-like member distal from the support.

6. The method of claim 1 further comprising providing non-clogging gaps between the buoyant member and the rod-like member within the slot.

7. A method of manufacturing a side-mountable liquid level sensor having (a) a rod-like member held to a support such as to be in a generally horizontal disposition when the sensor is side-mounted to a liquid container, the rod-like member having left and right sides and top and bottom sides, and (b) a buoyant member having a slot extending therein from one end thereof, the slot being defined by a pair of sides spaced apart to receive the rod-like member therebetween with the left and right sides of the rod-like member juxtaposed to the slot sidewalls whereby to allow the buoyant member to move laterally relative to the rod-like member depending upon liquid level in the liquid container, the method comprising:

associating a switch actuator with the buoyant member;

receiving a resilient grommet on the support surface;

providing an opening along the slot and through a portion of a peripheral outer wall sized to receive the rod-like member laterally therethrough and into the slot;

providing the buoyant member with a projection;

providing the rod-like member with a portion positioned to confront the projection of the buoyant member;

positioning the buoyant member such that the slot opening is directed at one of the top and bottom sides of the rod-like member with the projection bearing against the confronting rod-like member portion;

providing relative motion between the rod-like member and the buoyant member to cause the projection to snap over the confronting rod-like member portion such that the rod-like member passes laterally into the slot to bring the sides of the slot into juxtaposition with the left and right sides of the rod-like member whereby the projection and confronting rod-like portion cooperate to prevent the rod-like member from passing back out of the slot through the slot opening.

8. The method of claim 7 further comprising positioning the projection to extend beyond the end of the buoyant member and providing a wing extending away from one of the left and right sides of the rod-like member adjacent the end of the buoyant member to provide the confronting rod-like member portion.

9. The method of claim 8 further comprising providing a resilient such wing whereby the projection flexes the wing to snap thereover.

10. The method of claim 8 wherein the slot extends to a second, opposite end of the buoyant member, the method further comprising:

providing a second projection extending beyond the second end of the buoyant member;

providing a second wing extending away from one of the left and right sides of the rod-like member beyond the second end of the buoyant member and positioned to confront the second projection of the buoyant member;

positioning the buoyant member such that the slot opening is directed at one of the top and bottom sides of the rod-like member with at least one of the projections bearing against one of the wings;

providing relative motion between the rod-like member and the buoyant member to cause the rod-like member to pass laterally into the slot with the second projection snapping over the second wing.

11. The method of claim 10 further comprising positioning the buoyant member such that both of the projections bear against respective ones of the wings before providing relative motion and wherein the relative motion causes both projections to snap over the wings.

12. The method of claim 10 further comprising limiting longitudinal sliding of the buoyant member along the rod-like member by extending the first and second wings laterally of the rod-like member to confront the ends of the buoyant member.

13. The method of claim 7 further comprising positioning the buoyant member relative to the rod-like member with the buoyant member end adjacent a distal end of the rod-like member remote from the support and preventing the buoyant member from sliding longitudinally off the distal end of the rod-like member by extending the confronting rod-like member portion to confront the distal end of the buoyant member.

14. The method of claim 7 further comprising positioning the buoyant member relative to the rod-like member with the buoyant member end adjacent a distal end of the rod-like member remote from the support and forming an integral enlarged disc at the distal end of the rod-like member.

15. The method of claim 7 further comprising providing non-clogging gaps between the buoyant member and the rod-like member within the slot.

16. A method of manufacturing a side-mountable liquid level sensor having (a) a rod-like member held to a support such as to be in a generally horizontal disposition when the sensor is side-mounted to a liquid container, the rod-like member having left and right sides and top and bottom sides, and (b) a buoyant member having a slot extending between first and second ends of the buoyant member, the slot being defined by a pair of sidewalls spaced apart to receive the rod-like member therebetween with the left and right sides of the rod-like member juxtaposed to the slot sidewalls and with portions of the rod-like member extending beyond the ends of the buoyant member whereby to allow the buoyant member to move laterally relative to the rod-like member depending upon liquid level in the liquid container, the method comprising:

associating a switch actuator with the buoyant member;

receiving a resilient grommet on the support surface;

providing an opening along the slot and through a portion of a peripheral outer wall between the ends of the buoyant member and sized to receive the rod-like member laterally therethrough and into the slot;

providing the buoyant member with two pairs of arms extending beyond respective ends of the buoyant member adjacent the slot opening and respective ones of the slot sidewalls;

providing a pair of wings extending away from the left and right sides of the rod-like member at each portion thereof extending beyond the ends of the buoyant member, each pair of wings positioned to confront a respective pair of arms of the buoyant member to prevent the rod-like member from normally passing out of the slot opening;

positioning the buoyant member such that the slot opening is directed at one of the top and bottom sides of the rod-like member with at least one of the pairs of arms bearing against one of the pairs of wings;

providing relative motion between the rod-like member and the buoyant member to cause the one pair of arms to snap over the one pair of wings such that the rod-like member passes laterally into the slot to bring the sidewalls of the slot into juxtaposition with the left and right sides of the rod-like member whereby the arms and wings cooperate to prevent the rod-like member from passing back out of the slot through the slot opening.

17. The method of claim 16 further comprising positioning the buoyant member such that both of the arms bear against respective ones of the wings before providing relative motion and wherein the relative motion causes both respective pairs of arms to pass over respective pairs of wings.

18. The method of claim 16 further comprising providing non-clogging gaps between the buoyant member and the rod-like member within the slot.

* * * * *

UNITED STATES PATENT AND TRADEMARK OFFICE
CERTIFICATE OF CORRECTION

PATENT NO.   : 5,742,999

DATED        : April 28, 1998

INVENTOR(S)  : Edward Gomez, Jr.

It is certified that error appears in the above-identified patent and that said Letters Patent is hereby corrected as shown below:

Column 5, line 26, before "appropriate" please insert --the--;

Column 6, line 6, please delete "Fig. SC." and replace with --Fig. 5C.--;

Column 7, line 48, please delete "The method of claim 3", and replace with
--The method of claim 2--.

Signed and Sealed this

Fifth Day of January, 1999

Attest:

*Attesting Officer*                    *Acting Commissioner of Patents and Trademarks*